Sept. 13, 1949.  J. O. MOORHEAD  2,481,940
VALVE
Filed June 18, 1947

John O. Moorhead,
Inventor.
Hayner and Koenig,
Attorneys.

Patented Sept. 13, 1949

2,481,940

UNITED STATES PATENT OFFICE 2,481,940

VALVE

John O. Moorhead, Attleboro, Mass., assignor to Metals & Controls Corporation, Attleboro, Mass., a corporation of Massachusetts Application June 18, 1947, Serial No. 755,351

13 Claims. (Cl. 236—92)

This invention relates to valves, more particularly to a combined thermostatic and pressure relief valve.

Among the several objects of the invention may be noted the provision of an improved combined thermostatic and pressure relief valve, particularly for heated pressure vessels such as pressure cookers and the like, adapted to close and seal the vessel when its contents are above a predetermined temperature and below a predetermined pressure, but otherwise being open; the provision of a weight-biased valve of the class described which may be readily adjusted; the provision of a valve of this class which may be readily assembled and disassembled for easy cleaning; and the provision of a valve such as described which is easy and economical to manufacture. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a plan view of the valve of this invention;

Similar reference characters indicate corresponding parts throughout the several views of the drawings.

Figure 1:
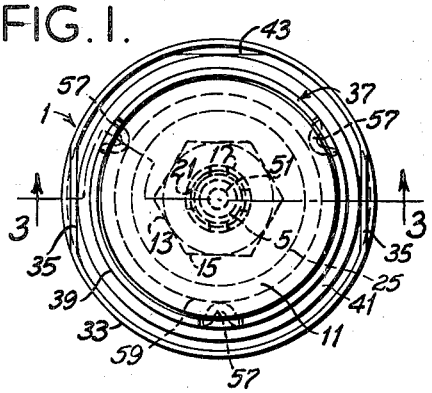
Figure 4:
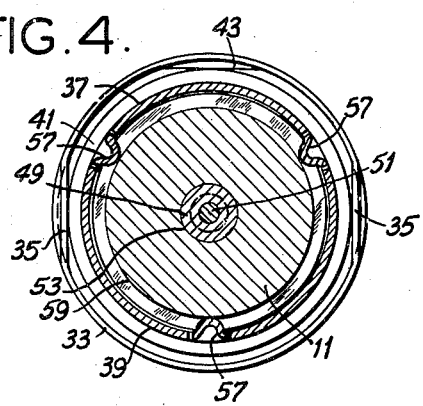
Fig. 4 is a horizontal section taken on line 4—4 of Fig. 3.
Figure 2:
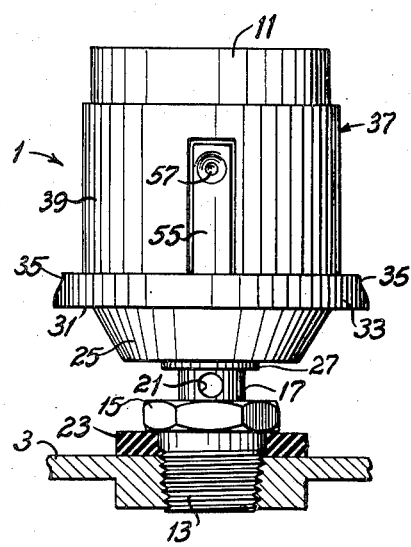
Fig. 2 is a side elevation thereof.

The valve of this invention is an improvement upon the valve disclosed in my copending U. S. application entitled Valve, Serial No. 633,372, filed December 7, 1945. The latter application discloses a combined thermostatic and pressure relief valve, particularly for use on heated pressure vessels such as pressure cookers or the like, which is adapted to remain open to vent the vessel to permit air to escape until the contents of the vessel reach a predetermined temperature. The valve thereupon closes and seals the vessel. This permits the temperature and pressure within the vessel to increase to desired values. If the pressure should become excessive, the valve, functioning as a pressure relief valve, opens to relieve the excess pressure. When heating of the vessel is discontinued, the contents of the vessel cool and a vacuum is created within the vessel. The valve, however, opens in response to decrease in temperature to vent the vessel and break the vacuum so that the vessel may be easily opened. The valve of the present invention functions as aforesaid, but embodies improvements in construction which make it easier to adjust and to assemble and disassemble, as will be made clear.

Referring to the drawing, the improved valve of this invention, generally designated 1, is adapted to be connected into the lid 3 of a pressure cooker or similar pressure vessel. It includes a valve member 5 which is raised to opened position with respect to a port 7 by a thermostatic element 9 to vent the vessel when the temperature therein is below a substantially predetermined value. The valve member 5 is gravity biased toward closed position with respect to the port by a weight 11. When the temperature within the vessel is above the aforesaid value, the thermostatic element releases the valve member, which is thereupon biased to closed position to block port 7 and seal the vessel. The arrangement is also such, as will be made clear, that the valve member and weight are movable independently of the thermostatic element 9 under the latter conditions in response to excessive pressure in the vessel to open the port and thereby to relieve the excess pressure.

The port 7 is formed in a fitting 13 adapted to be threaded into the lid 3 with the port in communication with the interior of the vessel. The fitting preferably has a hexagonal head 15 for application of a wrench to turn it. The port 7 is preferably formed as an axial bore extending from the lower end of the fitting through the head 15 into an enlarged chamber in an upper cylindrical extension 17 of the fitting. The port 7 leads into the chamber at an upwardly facing shoulder 19, which forms a valve seat for the valve member 5 intermediate port 7 and radial ports 21 in the cylindrical wall of the extension 17. The arrangement is such that when valve member 5 is raised above seat 19, the interior and exterior of the vessel are in communication through port 7, the interior of extension 17 and ports 21. When the fitting 7 is threaded into the lid 3, a washer 23 is provided between the head 15 and the lid to form a fluid-tight joint.

An upwardly opening cup-shaped casing 25 is fixed upon the upper end of the fitting 13. The upper end of the extension 17 of the fitting extends through a central aperture in the bottom wall of the cup, with the latter engaging an outwardly extending shoulder 27 formed adjacent the upper end of the extension. The casing is fixedly retained upon the upper end of the extension by heading over the latter, as indicated at 29, to form a riveted joint. The lip of casing 25 is shaped to provide an outwardly extending, lateral, annular shoulder 31 and an annular rim 33 extending upward from the outer periphery of the shoulder. The upper margin of the rim is formed to provide two chord-like indents 35, spaced at 180° intervals, for a purpose to be described.

The thermostatic element 9 is a snap-acting thermostatic plate, preferably a dished, snap-acting thermostatic disc of the type disclosed in Spencer U. S. Patent 1,448,240. This disc is peripherally supported upon the annular shoulder 31 of the casing 25 in position closing the open upper end of the casing. The disc is arranged to hold a position concave with respect to the interior of the casing (Fig. 3) when below a certain temperature (about 205° in the case of a pressure cooker) and to snap to an opposite position convex with respect to the interior of the casing when it is heated to and above that temperature. It is removably retained upon the shoulder 31 by means of a tubular retainer, generally designated 37, which also functions to retain the weight 11 in its assembled relationship with respect to the valve member 5, as will be made clear.

The retainer 37 comprises a hollow cylinder 39 having an outwardly extending, stepped, annular flange 41 at its lower end. This flange is rotatably fitted within the rim 33 of casing 25 with its outer margin resting upon the shoulder 31 of the casing. The indents 35 in the rim 33 nominally project over the outer margin of flange 41 to maintain the retainer in assembled relation with respect to casing 25. The periphery of disc 9 is loosely retained between shoulder 31 of the casing and the lower end of the retainer, so that it may snap freely while being maintained in position closing the open upper end of the casing. The flange 41 is discontinuous at a flat 43, so that it functions in cooperation with indents 35 as one element of a bayonet joint for detachably locking the retainer to the casing 25.

The valve member 5 comprises a ball valve 45 welded or otherwise fixed to the lower end of a valve stem 47. The latter extends upward loosely through a central aperture in the disc 9. A bushing 49 is adjustably threaded upon a reduced-diameter extension 51 of the valve stem 47 with its lower end engaging disc 9. The lower end of the bushing is counterbored to receive the upper end of the valve stem and to permit the bushing to be threaded down far enough on extension 51 to engage the disc. The bushing carries the weight 11, which is a relatively heavy cylindrical member loosely fitting within tubular retainer 37. The bushing fits loosely in a recess 53 extending axially into the weight 11 from its lower end.

The weight 11 is removably retained within the retainer 37 by means permitting limited vertical axial movement of the weight relative to the retainer. As illustrated, this means comprises a number of axially extending spring detent fingers 55 cut out of the cylindrical wall 39 of retainer 37 and having inwardly projecting bosses 57 at their free ends. Bosses 57 project into an annular groove 59 in the periphery of weight 11 removably to retain the weight within retainer 37. The groove 59 is substantially wider than the bosses so that the weight has limited axial movement with respect to the retainer. The weight may be removed from within the retainer by pulling upon it with sufficient force to spread the fingers 55 outward, thus to disengage bosses 57 from the groove 59.

Figure 3:
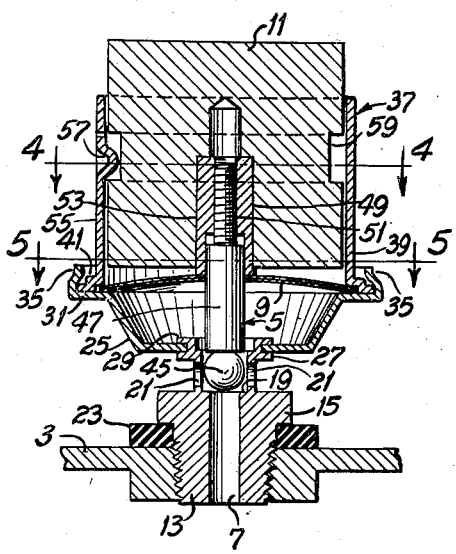
Fig. 3 is a vertical section taken substantially on line 3—3 of Fig. 1.

The mode of operation and use of the above-described valve is as follows:

When the disc 9 is below its hot snapping temperature (about 205° in the case of a pressure cooker) it is upwardly dished (concave) and supports bushing 49, weight 11 and valve member 5 in their raised position of Fig. 3. Valve ball 45 of valve member 5 is thus maintained spaced above valve seat 19 to open the valve. This spacing is determined by the adjustment of bushing 49 relative to valve stem 47 and is made less than the snap distance of the central portion of disc 9. Thus, at temperatures below its hot snapping temperature, disc 9 holds the valve up and open to vent the interior of the vessel through inlet port 7, the interior of extension 17 and outlet ports 21.

As the vessel is heated, air therein expands and escapes through the open valve. Disc 9 is heated, principally by conduction from the lid 3 through the valve. As steam is generated within the vessel, some of it may enter casing 25 and condense on the lower surface of the disc, thus giving up its heat thereto. When the contents of the vessel have been heated sufficiently, disc 9 reaches its hot snapping temperature and snaps to its downwardly dished (convex) configuration. Valve member 5 is thus released and drops downward to a position wherein ball 45 is seated on valve seat 19 to close the valve. The central portion of the disc travels downward farther than the valve member 5, this being permitted by the lost-motion connection of the disc and valve stem 47, the latter extending loosely through the central aperture in the disc. Thus the central portion of the disc is now disposed below the lower end of bushing 49 and does not provide support for the bushing and weight 11. Hence, the full weight of the latter is brought to bear upon valve member 5 tightly to close the valve and seal the vessel.

With the vessel sealed and upon continued heating, the temperature and pressure therein rise to predetermined values as determined by the force exerted to close the valve by weight 11. If the pressure within the vessel becomes excessive, the valve member 5 moves upward against the bias of the weight to open the valve and vent the vessel to relieve the excess pressure. Under these conditions, the valve stem 47 slides loosely upward through the central aperture in the disc 9. When heating is discontinued, the vessel and disc 9 cool. The latter, upon cooling, ultimately snaps to its Fig. 3 position, thus raising bushing 49, weight 11 and valve member 5 to open the valve. This vents the vessel to break the vacuum therein, making it easy to remove the lid 3.

Figure 5:
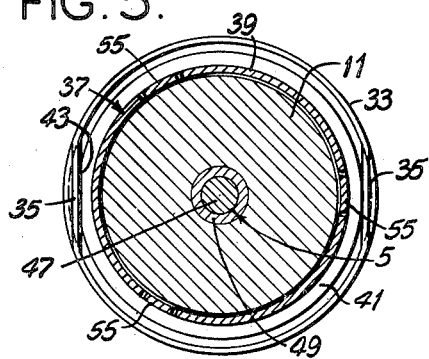
Fig. 5 is a horizontal section taken on line 5—5 of Fig. 3, illustrating parts in a different position.

If the valve becomes dirty, it may be readily assembled for cleaning and readily re-assembled after cleaning. The valve is easily disassembled by first pulling the weight 11 out of tubular retainer 37 as previously described. The retainer 37 is then rotated on its axis to bring the flat 43 on its flange 41 opposite one or the other of indents 35, as illustrated in Fig. 5. The retainer may then be tilted about the edge portion of flange 41 diametrically opposite the flat to disengage the flange from within the rim 33, thus to remove the retainer from the casing 25. The disc 9 and valve member 5 with bushing 49 thereon may then readily be removed for access to the interior of the casing. It will be understood that the above procedure is reversed to assemble the valve.

The spacing of the valve ball 45 above the valve seat 19 is readily adjusted by threading the bushing 49 to the desired adjusted position on valve stem extension 51 when the weight 11 is removed. The threads of bushing 49 should have a snug fit on the threads on 51 so as to be self-locking in adjusted position upon extension 51. This may be accomplished by axially slitting 49 in its threaded portion. The bushing 49 may also have a snug frictional fit in the recess 53 in weight 11 so that when the weight is pulled out of the retainer 37, the bushing and valve member 5 will also be pulled out therewith.

Thus, there is provided a combined thermostatic and pressure relief valve particularly adapted for use in connection with pressure cookers and the like. The provision for ready assembly and disassembly of the valve for cleaning makes the valve particularly suitable for use on household pressure cookers. While the weight 11 is readily removed for cleaning, it is nominally retained in assembled relation with the valve and will not fall out of the lid of the vessel if it is inverted.

In view of the above, it will be seen that the several objects of the invention are achieved and other advantageous results attained.

As many changes could be made in the above constructions without departing from the scope of the invention, it is intended that all matter contained in the above desciption or shown in the accompanying drawing shall be interpreted as illustrative and not in a limiting sense.

I claim:

1. A valve comprising a a valve seat intermediate an inlet and an outlet, a snap-acting thermostatic plate, a peripheral support for said plate, a tubular retainer detachably coupled to said support for peripherally retaining the plate removably assembled with the support, a valve member movable toward and away from said valve seat and having a stem extending through the plate into said retainer, means on said stem engageable by the plate to move the stem and valve member upward, and a weight disposed in said retainer and coupled to said stem to bias said valve member downward.

2. A valve as set forth in claim 1, further including means for retaining the weight in said retainer while permitting limited axial movement thereof relative to the retainer.

3. A valve comprising a valve seat intermediate an inlet and an outlet, a casing which opens upward, said casing having an upwardly facing annular shoulder, a snap-acting thermostatic disc peripherally supported on said shoulder, a tubular retainer detachably coupled to said casing and extending upward therefrom, said retainer including means for peripherally retaining the disc in position on said shoulder, a valve member movable toward and away from said valve seat and having a stem extending centrally through the casing and disc into the retainer, means on said stem engageable by the disc to move the stem and valve member upward, and a weight disposed in said retainer and bearing on said stem to bias said valve member downward.

4. A valve as set forth in claim 3, further including means for removably retaining the weight in said retainer while permitting limited axial movement of the weight relative to the retainer.

5. A valve comprising a valve seat intermediate an inlet and an outlet, a cup-shaped casing which opens upward, the lip of the casing being formed to provide an outwardly extending annular shoulder and an upstanding annular rim at the outer margin of the shoulder, a snap-acting thermostatic disc peripherally supported on said shoulder, a hollow cylindrical retainer having its lower end rotatably fitted within said rim and engaged over the peripheral margin of said disc for retaining the disc on said shoulder, cooperable bayonet joint means on the rim and the retainer, respectively, for detchably locking said retainer to the casing, a valve member movable toward and away from said valve seat and having a stem extending centrally through the casing and disc into the retainer, means on said stem engageable by the disc to move the stem and valve member upward, and a weight disposed in said retainer and bearing on said stem to bias said valve member downward.

6. A valve as set forth in claim 5, further including spring detent means on said retainer cooperable with said weight removably to retain it within the retainer while permitting limited axial movement thereof relative to the retainer.

7. A valve comprising a valve seat intermediate an inlet and an outlet, a cup-shaped casing which opens upward, the lip of the casing being formed to provide an outwardly extending annular shoulder and an upstanding annular rim at the outer margin of the shoulder, a snap-acting thermostatic disc peripherally supported on said shoulder, a hollow cylindrical retainer having an outwardly extending, stepped, discontinuous flange at its lower end rotatably fitted within said rim and engaged over the peripheral margin of the disc for retaining it on said shoulder, means on said rim extending inward over said flange for detachably locking said retainer to said casing, a valve member movable toward and away from said valve seat and having a stem extending centrally through the casing and disc into the retainer, means on said stem engageable by the disc to move the stem and valve member upward, and a weight disposed in said retainer and bearing on said stem to bias said valve member downward.

8. A valve as set forth in claim 7, further including spring detents formed from the cylindrical wall of the retainer and projecting into an annular groove in the periphery of the weight, said groove being wider than said detents to permit limited axial movement of the weight relative to the retainer.

9. A valve comprising a valve seat intermediate an inlet and an outlet, an annular supporting member, a snap-acting thermostatic disc peripherally supported on said member, a tubular retainer detachably coupled to said member and including means for peripherally retaining the disc on said member, a valve member movable toward and away from said valve seat and having a stem extending centrally through the disc into said retainer, a bushing adjustably threaded on the end of said stem within said retainer with its lower end engageable by the disc to move the stem and valve member upward, and a weight disposed in said retainer and bearing on said bushing to bias said valve member downward.

10. A valve comprising a valve seat intermediate an inlet and an outlet, an annular supporting member, a snap-acting thermostatic disc peripherally supported on said member, a hollow cylindrical retainer detachably coupled to said member and including means for peripherally retaining the disc on said member, a valve member movable toward and away from said valve seat and having a stem extending centrally through the disc into said retainer, a bushing adjustably threaded on the end of said stem within said retainer with its lower end engageable by the disc to move the stem and valve member upward, and a cylindrical weight disposed in said retainer and bearing on said bushing to bias said valve member downward, said weight having a recess extending into the weight from its lower end wherein the upper end of the bushing is removably fitted.

11. A combined thermostatic and pressure relief valve comprising a fitting for connection into a pressure vessel, said fitting having inlet and outlet ports and a valve seat intermediate said ports, a casing mounted on said fitting having an upwardly facing annular shoulder, a snap-acting thermostatic disc peripherally supported on said shoulder, a tubular retainer having its lower end detachably coupled to said casing and retaining the disc in position on said shoulder, a vertically reciprocable valve member movable upward from closed position with respect to said valve seat to open position and having a stem extending centrally through the casing and disc into the retainer, means on said stem engageable by the disc to hold the valve upward in open position when the disc is below a substantially predetermined temperature, and a weight disposed in said retainer and bearing on said stem to bias said valve member downward to closed position when the disc is above said temperature.

12. A combined thermostatic and pressure relief valve as set forth in claim 11, further including means for retaining the weight in said retainer while permitting limited vertical movement thereof relative to the retainer.

13. A combined thermostatic and pressure relief valve as set forth in claim 11, further including means for adjusting the spacing of the valve member from its seat in the open position of the valve member.

JOHN O. MOORHEAD.

REFERENCES CITED

The following references are of record in the file of this patent:

UNITED STATES PATENTS

| Number | Name | Date |
|---|---|---|
| 1,600,322 | Davis | Sept. 21, 1926 |
| 1,773,698 | Spencer | Aug. 19, 1930 |
| 2,031,558 | Clifford | Feb. 18, 1936 |
| 2,105,971 | Grigg | Jan. 18, 1938 |
| 2,258,336 | Moore | Oct. 7, 1941 |
| 2,268,359 | Tustin | Dec. 30, 1941 |
| 2,276,371 | Cooper | Mar. 17, 1942 |

FOREIGN PATENTS

| Number | Country | Date |
|---|---|---|
| 5,201 | Great Britain | 1908 |